(12) United States Patent
Cheng et al.

(10) Patent No.: US 11,583,834 B2
(45) Date of Patent: Feb. 21, 2023

(54) CATALYST FOR AUTOMOTIVE EMISSIONS CONTROL

(71) Applicant: Ford Global Technologies, LLC, Dearborn, MI (US)

(72) Inventors: Yisun Cheng, Bloomfield Hills, MI (US); Giovanni Cavataio, Dearborn, MI (US); Jeffrey Scott Hepburn, Birmingham, MI (US); Mira Bumbaroska, Plymouth, MI (US); Carolyn Parks Hubbard, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 16/645,648

(22) PCT Filed: Sep. 18, 2017

(86) PCT No.: PCT/US2017/052001
§ 371 (c)(1),
(2) Date: Mar. 9, 2020

(87) PCT Pub. No.: WO2019/055040
PCT Pub. Date: Mar. 21, 2019

(65) Prior Publication Data
US 2020/0276563 A1 Sep. 3, 2020

(51) Int. Cl.
B01J 21/04 (2006.01)
B01J 21/06 (2006.01)
(Continued)

(52) U.S. Cl.
CPC ......... B01J 23/464 (2013.01); B01J 35/0006 (2013.01); F01N 3/101 (2013.01);
(Continued)

(58) Field of Classification Search
CPC . B01J 21/04; B01J 21/066; B01J 23/10; B01J 23/42; B01J 23/44; B01J 23/462;
(Continued)

(56) References Cited

U.S. PATENT DOCUMENTS

| 4,172,047 A | 10/1979 | Gandhi et al. |
| 5,376,610 A * | 12/1994 | Takahata ................. F01N 3/222 |
| | | 502/65 |

(Continued)

FOREIGN PATENT DOCUMENTS

| CN | 105964253 A | 9/2016 |
| CN | 106000397 A | 10/2016 |

(Continued)

OTHER PUBLICATIONS

Miura, M. et al., "Development of Advanced Three-Way Catalyst with Improved NOx Conversion," SAE Technical Paper 2015-01-1005, 2015, 1 pages.
(Continued)

*Primary Examiner* — Cam N. Nguyen
(74) *Attorney, Agent, or Firm* — Vincent Mastrogiacomo; Brooks Kushman P.C.

(57) ABSTRACT

An automotive catalytic converter includes a three-way catalyst having Rh as the only precious metal configured as a front zone and a three-way catalyst having a mixture of Rh and Pd, Pt, or both configured as a rear zone, such that an exhaust gas from an internal combustion engine passes through the front zone before passing through the rear zone to minimize sulfur poisoning of the catalytic converter.

20 Claims, 8 Drawing Sheets

(51) Int. Cl.
*B01J 23/10* (2006.01)
*B01J 23/42* (2006.01)
*B01J 23/46* (2006.01)
*B01J 23/56* (2006.01)
*B01J 23/63* (2006.01)
*B01J 35/00* (2006.01)
*F01N 3/10* (2006.01)
*F01N 3/28* (2006.01)
*B01J 23/44* (2006.01)

(52) U.S. Cl.
CPC ............ *F01N 3/2807* (2013.01); *B01J 21/04* (2013.01); *B01J 21/066* (2013.01); *B01J 23/42* (2013.01); *B01J 23/44* (2013.01); *B01J 23/462* (2013.01); *F01N 2570/04* (2013.01)

(58) Field of Classification Search
CPC . B01J 23/464; B01J 23/56; B01J 23/63; B01J 35/0006; F01N 3/101; F01N 3/2807; F01N 2570/04
See application file for complete search history.

(56) References Cited

U.S. PATENT DOCUMENTS

| | | | | |
|---|---|---|---|---|
| 5,439,865 A * | 8/1995 | Abe | ............ | B01J 23/63 502/355 |
| 5,948,723 A * | 9/1999 | Sung | ............ | B01J 37/038 502/303 |
| 6,087,298 A * | 7/2000 | Sung | ............ | B01D 53/9477 502/333 |
| 6,375,910 B1 | 4/2002 | Deeba et al. | | |
| 6,692,712 B1 | 2/2004 | Andersen | | |
| 6,764,665 B2 * | 7/2004 | Deeba | ............ | B01J 23/63 423/239.1 |
| 7,754,171 B2 * | 7/2010 | Chen | ............ | B01J 37/0244 60/302 |
| 7,758,834 B2 * | 7/2010 | Chen | ............ | F01N 13/0097 60/299 |
| 7,922,988 B2 * | 4/2011 | Deeba | ............ | B01D 53/9472 422/177 |
| 9,266,092 B2 | 2/2016 | Arnold et al. | | |
| 9,352,279 B2 * | 5/2016 | Greenwell | ............ | B01J 35/10 |
| 9,366,166 B2 * | 6/2016 | Blakeman | ............ | B01J 35/04 |
| 9,486,793 B2 * | 11/2016 | Klingmann | ............ | B01J 21/04 |
| 9,517,462 B2 * | 12/2016 | Roesch | ............ | B01J 37/0244 |
| 9,522,360 B2 * | 12/2016 | Schmidt | ............ | B01D 53/945 |
| 9,581,063 B2 * | 2/2017 | Klingmann | ............ | B01J 23/44 |
| 9,597,663 B2 * | 3/2017 | Inoda | ............ | B01J 23/464 |
| 9,604,175 B2 * | 3/2017 | Hatfield | ............ | B01J 35/04 |
| 9,656,209 B2 * | 5/2017 | Chang | ............ | B01J 23/63 |
| 9,707,545 B2 * | 7/2017 | Felix | ............ | B01J 23/44 |
| 9,764,286 B2 * | 9/2017 | Cavataio | ............ | B01D 53/9431 |
| 9,919,294 B2 * | 3/2018 | Laing | ............ | B01J 27/1804 |
| 10,252,217 B2 * | 4/2019 | Zhang | ............ | B01J 21/04 |
| 2004/0001781 A1 | 1/2004 | Kumar et al. | | |
| 2008/0081762 A1 | 4/2008 | Kitamura et al. | | |
| 2009/0175773 A1 * | 7/2009 | Chen | ............ | B01J 20/3021 422/177 |
| 2009/0217652 A1 | 9/2009 | Bergeal et al. | | |
| 2012/0040824 A1 | 2/2012 | Itou et al. | | |
| 2016/0158699 A1 | 6/2016 | Cavataio et al. | | |
| 2016/0256854 A1 | 9/2016 | Aoki | | |
| 2016/0279611 A1 | 9/2016 | Goldent et al. | | |
| 2017/0362984 A1 | 12/2017 | Li et al. | | |

FOREIGN PATENT DOCUMENTS

| | | |
|---|---|---|
| JP | 2008240622 A | 10/2008 |
| KR | 20130060028 A | 6/2013 |
| WO | 2011060917 A1 | 5/2011 |

OTHER PUBLICATIONS

Buwono, H.P., et al., "Surface Properties of Rh/AlPO4 Catalyst Providing High Resistance to Sulfur and Phosphorus Poisoning," American Chemical Society, Jul. 7, 2015, 9 pages.
"Cerium(IV) oxide," dated Sep. 7, 2017, retrieved from the Internet URL: https://web.archive.org/web/20170907061157/https://en.wikipedia.org/wiki/Cerium(IV)_oxide, on Feb. 28, 2019, pp. 1-12.
International Search Report of the International Searching Authority for PCT/US2017/052001 dated Nov. 20, 2017.

* cited by examiner

CATALYST FOR AUTOMOTIVE EMISSIONS CONTROL

CROSS-REFERENCE TO RELATED APPLICATION

This application is the U.S. national phase of PCT Application No. PCT/US2017/052001, filed Sep. 18, 2017, the disclosure of which is hereby incorporated in its entirety by reference herein.

TECHNICAL FIELD

The disclosure relates to an automotive three-way catalyst (TWC) and a method of producing the same.

BACKGROUND

Reduction of tailpipe emissions is a challenging goal in the automotive industry. As the acceptable values for tailpipe emissions continue to decrease, technologies must continually improve to meet the standards. Many efforts have been focused on reduction of various hydrocarbons (HCs), carbon monoxide (CO), and mono-nitrogen oxides NO and $NO_2$ (NOx) emissions. Various catalysts capable of converting HC species, CO, and NOx have been developed. Yet, providing a cost-effective TWC capable of efficient conversion has remained a challenge.

SUMMARY

In at least one embodiment, an automotive catalytic converter is disclosed. The catalytic converter includes a three-way catalyst including Rh as the only precious metal configured as a front zone and a three-way catalyst including a mixture of Rh and Pd, Pt, or both configured as a rear zone, such that an exhaust gas from an internal combustion engine passes through the front zone before passing through the rear zone to reduce sulfur poisoning of the catalytic converter. Rh loading in the front zone may be about 4 to 45 $g/ft^3$ (0.14 to 1.59 $g/dm^3$), based on an overall PGM loading per volume of monolithic substrate. Rh loading in the front zone may be about 5 times higher than Rh loading in the rear zone. The converter may further include an additional zone including a three-way catalyst including Rh as the only precious metal, the additional zone being arranged such that the rear zone is sandwiched between the front zone and the additional zone. A length/volume ratio of the front zone to the rear zone may be from about 100 to 1, but different from 50/50. The front zone may form about 5% and the rear zone about 95% of an overall converter volume. The converter may be a close-coupled converter. The converter may include a support having a porosity of about 50-80%.

In an alternative embodiment, an automotive catalytic converter is disclosed. The converter may include a three-way catalyst including Rh as the only precious metal arranged as a top layer. The converter may further include a three-way catalyst including a mixture of Rh, Pd, Pt, Ru, or a combination thereof, configured as a bottom layer. The top and bottom layers may be configured as discreet layers such that an exhaust gas from an internal combustion engine passes through the top layer before passing through the bottom layer to reduce sulfur poisoning of the catalytic converter. The converter further includes a support including alumina and CZO having Ce and Zr in a ratio of Ce:Zr from about 0 to 100. Rh loading in the top layer may be about 4 to 45 $g/ft^3$ (0.14 to 1.59 $g/dm^3$), based on an overall PGM loading per volume of monolithic substrate. The bottom layer may include Rh, Rh loading in the bottom layer being about 5 times lower than the Rh loading in the top layer. The top layer, the bottom layer, or both may have at least a first zone and a second zone, the zones being discreet zones with different PGM loadings. A first zone of the top layer may have Rh loading of about 4 to 45 $g/ft^3$ (0.14 to 1.59 $g/dm^3$), based on an overall PGM loading per volume of monolithic substrate, and a second zone of the top layer having Rh loading about five times lower than the first zone. The bottom layer may include no other precious metal besides Pd.

In a yet another embodiment, an automotive catalytic converter is disclosed. The converter may include a first three-way catalyst comprising a single precious metal, arranged on a support, as a top layer and a second three-way catalyst comprising at least Rh as a precious metal, the second three-way catalyst configured as a bottom layer. The top and bottom layers may be configured such that an exhaust gas from an internal combustion engine passes through the top layer before passing through the bottom layer to reduce sulfur poisoning of the catalytic converter. The top layer and the bottom layer may include Rh as the only precious metal such that the Rh loading in the top layer is different from the Rh loading in the bottom layer. The single precious metal may be Rh. The bottom layer may include Rh, Pd, Pt, Ru, or a combination thereof. The converter may further include a third three-way catalyst including Rh as the only precious metal, the third three-way catalyst forming a discreet layer configured such that the first and third three-way catalysts sandwich the second three-way catalyst in between. The length/volume ratio of the top layer to the bottom layer may be from about 100 to 1, but different from 50/50.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The terms "PGM loading," "loading," and "precious metal loading" used herein are used interchangeably such that any of the terms may refer to loading of catalytically active material including additional material besides the platinum group of metals.

The exhaust gas from internal combustion engines, including those used in automotive applications, contains HCs, CO, and NOx in concentrations greater than can be permissibly emitted into the environment. The concentrations of the undesirable exhaust components named above are typically reduced by their interaction with one or more suitable catalytic converters. A typical catalytic converter may include a TWC. TWCs can work simultaneously and efficiently to reduce NO and oxidize CO and HCs at moderate temperatures (e.g., about 300 to 500° C.) when the engine runs at stoichiometry, that is when the air-fuel ratio (AFR) is the ideal ratio of air to fuel that burns all fuel with no excess air. For gasoline engines, the stoichiometric AFR is 14.7:1, which means 14.7 parts of air to one part of fuel. The stoichiometric AFR depends on the type of fuel. For example, for alcohol, the stoichiometric AFR is 6.4:1 and for diesel, the stoichiometric AFR is 14.5:1. Generally, an engine operating at the stoichiometric AFR oscillates between a slightly rich condition and a slightly lean condition at frequencies on the order of about 0.5 to 3.0 Hz and with magnitudes on the order of +/−0.07 lambda, +/−0.05 lambda, +/−0.03 lambda, or +/−0.01 lambda, depending on the engine and control system. Lambda=1.006 relates to oxygen level of 0.74% and stoichiometric condition. Lambda=0.998 relates to oxygen level of 0.69% and slightly rich conditions.

Under some vehicle operating conditions, especially under cold start conditions, engine exhaust may pass through a catalytic converter while the temperature of the converter is below the light off temperature of one or more exhaust components. Cold start emissions relate to the emissions of gasoline and diesel passenger vehicles which are not reduced by catalysts during a warm-up phase of the vehicle. Before the engine reaches the temperature sufficient to warm the catalyst after a vehicle is started, emissions are not being reduced and thus represent a significant portion of overall tailpipe emissions. The duration of the cold start period and the overall emissions produced during this phase depend on the ambient temperature, the type of fuel used, the initial temperature of the vehicle's propulsion system, and other factors. Under such operating conditions, the catalytic converter is unable to effectively reduce the concentration of one or more undesirable exhaust gas components. Thus, it would be desirable to develop a catalyst with increased efficiency during cold start. This is especially pertinent as more fuel-efficient powertrains that utilize internal combustion engines may have lower operating temperatures than today's powertrains. These lower operating temperatures may create exhaust gas with temperatures below the current activity window of today's three-way catalysts.

Catalytic converters include a core formed from a single or dual monoliths. The dual-catalyst system presents certain advantages compared to the single monolith catalyst converters as it allows judicious placement of the precious metals and selection of washcoat technologies to better optimize emission performance than the single-monolith catalytic converters.

A monolithic catalyst support is typically an extruded substrate from materials such as ceramic, synthetic cordierite, metal, or other materials having a low thermal expansion coefficient. The monolith includes a high number of channels separated by thin walls to provide a large surface area. Dual-monolith catalytic converters have been an effective emission solution for both underfloor and close-coupled low emission vehicles (LEV)/ultra low emission vehicles (ULEV) applications due to optimal hydrocarbon light-off, NOx control, and balance of precious metal (PGM) usage.

TWCs are typically composed of a mixture of precious metals such as platinum (Pt), palladium (Pd), and rhodium (Rh), generally called the platinum group metals (PGM) as the catalytically active components on a support such as aluminum oxide ($Al_2O_3$)— and cerium oxide ($CeO_2$)-based material. While the catalyst material itself is a mixture of precious metals such as those named above: Pt, Pd, and Rh, Pd-only systems have demonstrated LEV/ULEV emissions performance, and the initial commercial ULEV emission system used Pd-only underfloor catalysts. In general, dual catalyst options with a mixture of precious metals provide lower emissions using substantially lower PGM loadings with more balanced usage. For example, dual-monolith systems containing Pd-only in the front followed by rear Pd/Rh TWCs have demonstrated satisfactory LEV performance for close-coupled dual exhaust manifold V-6 applications. Subsequently, dual-catalyst technologies including Pd up front, followed by Pt/Rh TWCs have demonstrated equivalent performance to [Pd+Pd/Rh] catalyst systems for underfloor V-6 applications.

Currently, typical catalyst converters in gasoline vehicles for LEV/ULEV emission levels are dual-monolith catalytic converters. Such catalytic converters contain a front close-coupled Pd/Rh TWCs with high Pd/Rh ratio and high PGM loadings, and a back underfloor Pd/Rh TWCs with low Pd/Rh ratio and low PGM loadings.

Although the technologies of TWCs are well-established, further improvement of catalytic efficiency and stability is still required because automotive emission regulations are becoming more and more stringent in the world. An example classification for passenger vehicle emissions is Super Ultra-Low Emission Vehicle SULEV20 and SULEV30. The SULEV classification is based on producing 90% less emissions than an equivalent gasoline-powered vehicle. The SULEV vehicles are thus 90% cleaner than the average new vehicle for the model year. To comply with the SULEV and similar classifications, various strategies have been implemented, for example, improving TWCs incorporated into catalytic converters.

Additionally, it has been recognized that the $SO_2$ emitted from the engine can interact with the catalyst, resulting in catalyst poisoning. $SO_2$ can be oxidized or reduced to produce undesirable, unregulated pollutants. Despite the advent of low sulfur-containing fuels, it has long been known that even trace $SO_2$ can profoundly interact with washcoat components such as the precious metals, alumina, and ceria, and suppress the reaction path selectively, as well as deactivate the TWC performance. Sulfur poisoning may also increase the $N_2O$ formation, especially for the Pd-only TWCs.

Sulfur poisoning presents an additional challenge in combination with ongoing goals to improve fuel economy. As the fuel is more efficiently used to deliver useful work rather than be wasted in the exhaust gases, the improvements have resulted in lower exhaust temperatures. Thus, the TWC systems must be adapted to operate as lower temperatures as well. Yet, sulfur poisoning deactivates Pd-based catalysts more rapidly at lower temperatures because Pd-sulfur regeneration is slower during lower temperature conditions.

Additional compounds may contribute to deactivation of the catalyst. For example, phosphorus poisoning may have a negative effect. Complete removal of phosphorus may not be an option with respect to all types of fuel.

Thus, it would be desirable to develop a TWC capable of capable of converting emissions from automotive exhaust including, but not limited to, ethylene ($C_2H_4$), propylene ($C_3H_6$), ethane ($C_2H_6$), butylene ($C_4H_8$), mesitylene ($C_9H_{12}$), toluene ($C_6H_5$—$CH_3$), iso-octane ($C_8H_{18}$), cyclopentane ($C_5H_{10}$), iso-hexane ($C_6H_{14}$), pentylene ($C_5H_{10}$), dimethylbutane ($CH_3)_3CCH_2CH_3$, benzene ($C_6H_6$), durene ($C_{10}H_{14}$), propane ($C_3H_8$), methane ($CH_4$), nitrogen oxide (NO), nitrogen dioxide ($NO_2$), reducing $NH_3$ and $N_2O$ emissions, yielding improved net NOx conversion to $N_2$ while improving sulfur tolerance and phosphorus of the TWC. And further, it would be desirable to develop a TWC having the named properties while allowing for material cost savings.

The current disclosure solves one or more of the above-mentioned problems by providing a catalytic converter including a TWC having at least one portion which includes Rh as a single precious metal or an exclusive source of catalytically-active material. In other words, the portion of the TWC does not contain another precious metal besides Rh. Thus, the portion of the TWC may consist essentially of, or preferably consist of Rh with respect to precious metals. The Rh-including TWC may form the first catalytically active zone which the exhaust gas encounters after the combustion process is accomplished. The exhaust gas first encounters the Rh-only TWC before continuing to other portions of the converter such as another TWC.

Besides the Rh-including TWC, the catalytic converter may include at least a second portion including one or more catalytically-active materials such as precious metals, preferably also including Rh. The catalytic converter may include additional portions besides TWCs.

Figure 1:
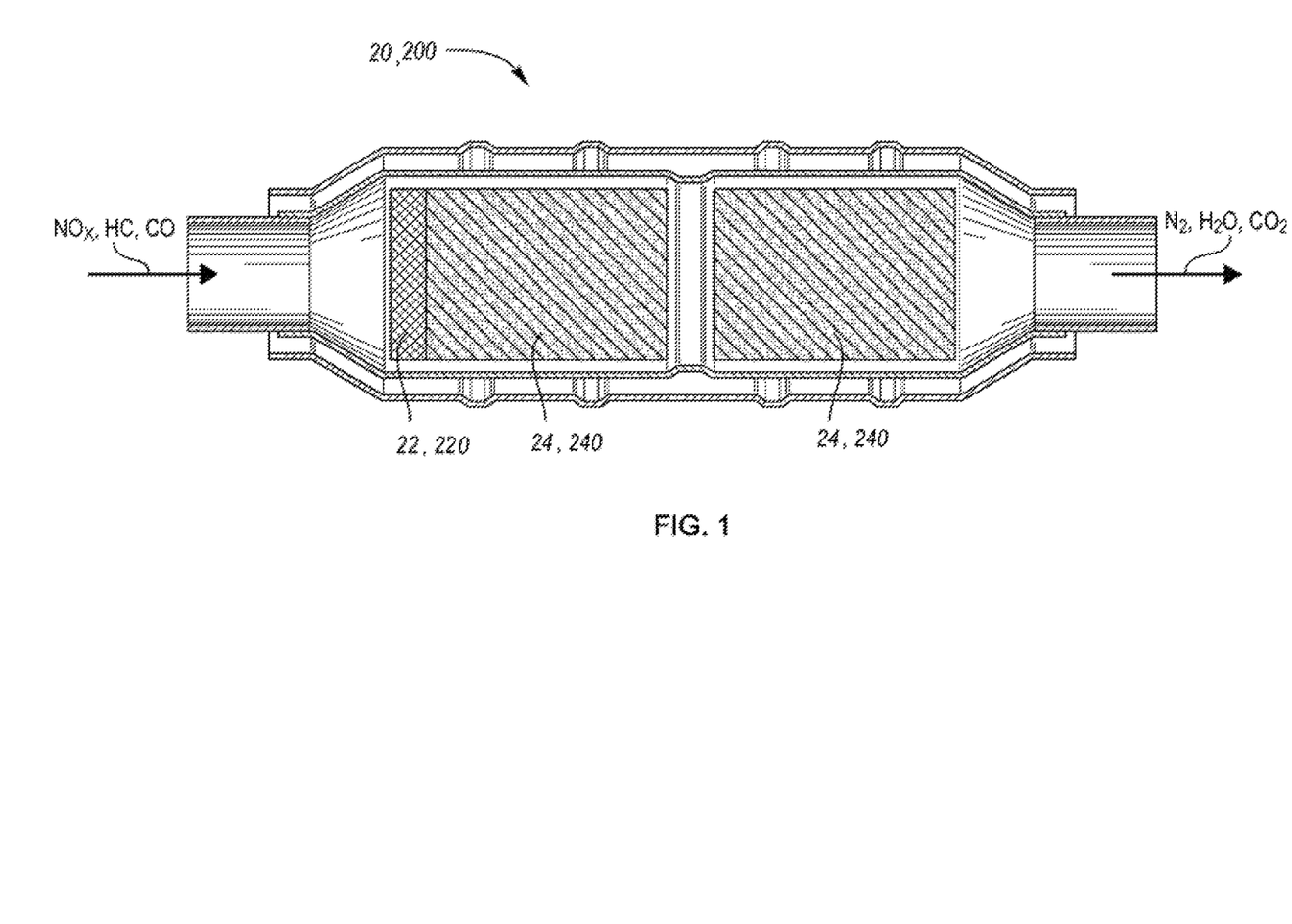
FIG. 1 shows a schematic catalytic converter having one or more TWCs according to one or more embodiments.

A non-limiting example catalytic converter 20 is schematically depicted in FIG. 1. The catalytic converter 20 may include an optional trap 22 located upstream, and/or downstream from the three-way catalyst (TWC) 24. The trap 22 may enable temporary storage of combustion gas until the catalytic converter reaches temperatures enabling conversion of the combustion gas. The catalytic converter 20 may be configured as flow through channels or having a wall flow configuration. The TWCs described in the disclosure may be a part of close-coupled or underfloor catalytic converter.

The catalytic converter 20, the dimensions and orientation of the depicted layers 22, 24 is just schematic to illustrate the main direction of the exhaust gas flow. Likewise, in the figures of this disclosure, the depicted dimensions may be for illustration purposes only. The arrow in the figures indicates the direction of the exhaust gas flow.

Figure 2A:
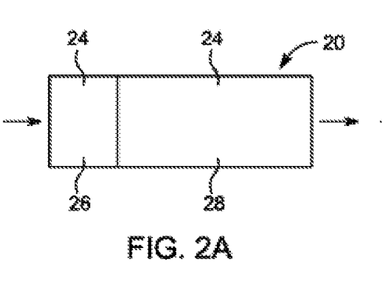
FIGS. 2A and 2B depict schematic configurations of example front and rear TWCs of the converter depicted in FIG. 1.

Non-limiting examples of discreet portions of a catalytic converter 20 are schematically depicted in FIGS. 2A-4. FIGS. 2A and 2B show schematic arrangements of two TWCs 24, a first TWC 26 having Rh as the single precious metal. The TWC 24 thus includes Rh as the only catalytically active material. The TWC 26 is configured as a front zone such that an exhaust gas from the internal combustion engine passes through the front zone before passing through any additional TWC 24.

Historical use of Rh in TWC has been very low compared to Pd because of cost differences. In the past 7 years, Rh cost per troy ounce has steadily dropped and is now approximately equivalent to Pd, price of which has been rising. This offers the opportunity to incorporate more Rh into the TWC design while keeping production of the converter cost-effective.

Figure 3A:
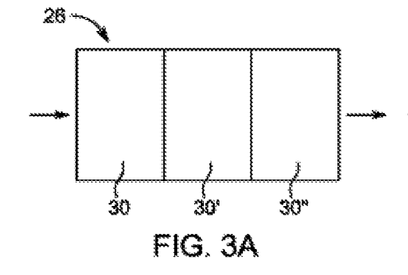
FIGS. 3A-3D schematically depict configuration of discreet zones within a TWC of the converter depicted in FIG. 1.

As FIGS. 3A-3D illustrate, the TWC 26 may be further divided into discreet zones 30, 30', and/or 30", each containing different Rh loading. Additional zones are contemplated. The zones 30, 30', and/or 30" may have substantially the same dimensions such as length, height, thickness, volume, as FIG. 3A shows. Alternatively, each zone may differ from the other zones by at least one dimension. The length/volume ratio of zones 30:30':30" may be about 98:1:1, 90:5:5, 80:10:10, 70:20:10, 60:20:20, 50:25:25, 45:45:10, 38:31:31, 33.3:33.3:33.3, 20:55:25, 10:50:40, or the like.

Figure 3B:
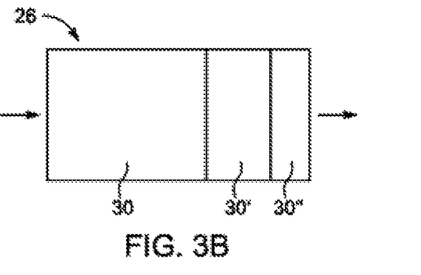
Figure 3C:
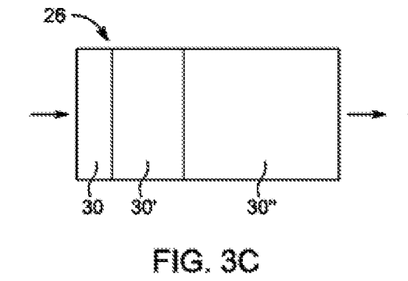
Figure 3D:
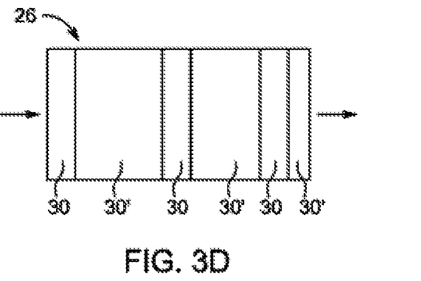

Rh loading may be different in each zone such that the Rh loading may increase or decrease in the direction of the combustion gas flow. For example, the highest loading may be in zone 30, lower Rh loading in the zone 30', and the lowest Rh loading may be in the zone 30". The zone with the highest loading may have the greatest length, as is depicted in FIG. 3B. Alternatively, the zone with the highest loading may have the smallest length, as is depicted in FIG. 3C. In a yet alternative embodiment, shown in FIG. 3D, the zones 30 and 30' may alternate such that the zone 30 with Rh loading (a) repeats, and the zone 30' with Rh loading (b) repeats, Rh loading (a) being higher or lower than Rh loading (b).

Rh loading of the TWC 26, each zone 30, 30', 30", or an additional zone, may be at least about 4 g/ft$^3$ (0.14 g/dm$^3$). Rh loading may be about 4, 4.25, 4.5, 4.75, 5, 5.5, 6, 6.5, 7, 7.5, 8, 9, 10, 11, 12, 13, 14, 15, 18, 20, 25, 30, 35, 40, 45, 50, 55, 60, 70, 80, 90, 100 g/ft$^3$ or more or 0.14, 0.15, 0.16, 0.17, 0.18, 0.19, 0.2, 0.23, 0.25, 0.28, 0.32, 0.35, 0.39, 0.42, 0.46, 0.5, 0.53, 0.64, 0.71, 0.88, 1.06, 1.24, 1.41, 2.00, 1.77, 1.94, 2.12, 2.48, 2.83, 3.18, 3.53 g/dm$^3$, based on an overall PGM loading per volume of monolithic substrate. Rh loading may be about 4 to 30, 4.2 to 20, or 4.5 to 10 g/ft$^3$ which equals to 0.14 to 1.06, 0.15 to 0.7, or 0.16 to 0.36 g/dm$^3$, based on an overall PGM loading per volume of monolithic substrate.

Figure 2B:
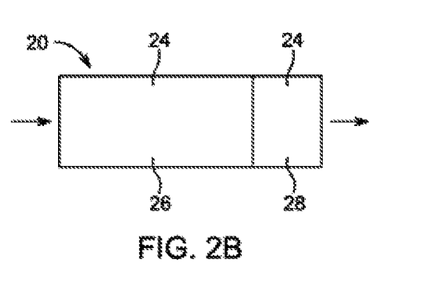

The converter 20 further includes a second discreet zone including a TWC 28. The TWC 28 includes a mixture of catalytically-active material such as precious metals. The mixture may include Rh, Pd, Pt, Ru, Ir, Co, Au, Ag, or a combination thereof. The TWC 28 forms a rear zone TWC such that the exhaust gas passes via the TWC 26 first before entering the TWC 28.

The TWC 28 may be subdivided into discreet zones as described with respect to the TWC 26. In one or more embodiments, the TWC 28 may include Rh as the only precious metal. In such embodiment, the Rh loading of the TWC 26 and the TWC 28 may be the same or differ. The TWCs 26 and 28 may thus differ by the type of support material, for example, but may both be Rh-only TWCs, including the same Rh loading. But, it is contemplated that TWC 28 will include a mixture of precious metals, especially Pd and Rh, or Pd, Rh, and Pt such that Rh loading of TWC 26 and TWC 28 differs.

The precious metal loading of the TWC 28 may be about 1 to 300, 5 to 200, 10 to 100, 15 to 50, or 20 to 25 g/ft$^3$ or 0.04 to 10.6, 0.18 to 7.06, 0.35 to 3.53, 0.53 to 1.77, or 0.7 to 0.88 g/dm$^3$ for each precious metal or total loading. The PGM/precious metal loading of the TWC 28 may be 1, 2, 3, 4, 5, 6, 7, 8, 9, 10, 11, 12, 13, 14, 15, 16, 17, 18, 19, 20, 21, 22, 23, 24, 25, or 26 times higher or lower than PGM/precious metal loading of the TWC 26. For example, Rh loading of the TWC 28 may be 5 times higher than Rh loading of the TWC 26.

Figure 4:
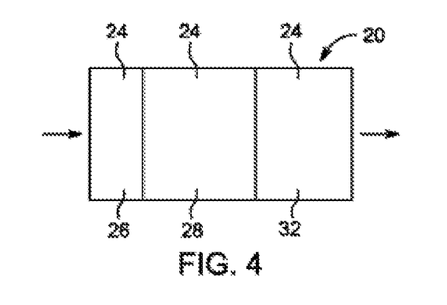
FIG. 4 shows a schematic configuration of example TWCs of the converter depicted in FIG. 1.

As FIG. 4 illustrates, the catalytic converter 20 may include an additional TWC 32. The additional TWC 32 may be an Rh-exclusive TWC such that the TWC 32 includes Rh as the only precious metal or catalytically-active material. The loading of Rh in TWC 32 may be the same or different than Rh loading in the TWCs 26 and 28. Rh loading in the TWC 32 may be about 1, 1.25, 1.5, 1.75, 2, 2.25, 2.5, 2.75, 3, 3.25, 3.5, 3.75, 4, 4.25, 4.5, 4.75, 5, 5.5, 6, 6.5, 7, 7.5, 8, 9, 10, 11, 12, 13, 14, 15, 18, 20, 25, 30, 35, 40, 45, 50, 55, 60, 70, 80, 90, 100 g/ft$^3$ or more or 0.035, 0.044, 0.053, 0.06, 0.07, 0.08, 0.09, 0.10, 0.11, 0.11, 0.12, 0.13, 0.14, 0.15, 0.16, 0.17, 0.18, 0.19, 0.2, 0.23, 0.25, 0.28, 0.32, 0.35, 0.39, 0.42, 0.46, 0.5, 0.53, 0.64, 0.71, 0.88, 1.06, 1.24, 1.41, 2.00, 1.77, 1.94, 2.12, 2.48, 2.83, 3.18, 3.53 g/dm$^3$, based on an overall PGM loading per volume of monolithic substrate. Rh loading may be about 4 to 30, 4.2 to 20, or 4.5 to 10 g/ft$^3$ which equals to 0.14 to 1.06, 0.15 to 0.7, or 0.16 to 0.36 g/dm$^3$, based on an overall PGM loading per volume of monolithic substrate.

The additional TWC 32 is located behind the TWC 28 with respect to the flow of the combustion gas. As a result, the rear zone, TWC 28, is sandwiched between the TWC 26 and the TWC 32.

The length/volume ratio of the TWC 26 to TWC 28 may be from about 100 to 0. The length/volume ratio of TWC 26 to TWC 28 may be about 99:1, 80:20, 70:30, 64:46, 40:60, 30:70, 25:75, 20:80, 10:90, or the like. In an embodiment including additional TWCs, such as the embodiment depicted in FIG. 4 with the TWC 32, the length/volume ratio of the TWC 26:TWC 28:TWC 32 may be from about 100 to 0. The ratio of TWC 26:TWC 28:TWC 32 may be about 98:1:1, 90:5:5, 80:10:10, 70:20:10, 60:20:20, 50:25:25, 45:45:10, 38:31:31, 33.3:33.3:33.3, 20:55:25, 10:50:40, or the like. The ratio of TWC 26 to TWC 28 may be different from 50:50.

The TWC 26, TWC 28, and TWC 32 may form 100% of the catalytic converter volume. Each zone may form about 1, 2, 3, 4, 5, 6, 7, 8, 9, 10, 15, 20, 25, 30, 33.3, 35, 40, 45, 50, 55, 60, 65, 70, 75, 80, 85, 90, 98, 99, 100% of the catalytic converter volume. The TWC 28 and TWC 32 may not be present such that that TWC 26 forms 100% of the catalytic converter volume. In at least one embodiment, the front zone, TWC 26, may form about 5% of the overall converter volume.

In a yet another embodiment, the catalytic converter 200 may include a layered system of TWCs 240 such as the schematic non-limiting examples depicted in FIGS. 5A-5G and FIG. 6. The catalytic converter 200 may include a first TWC forming a top layer 210 and optionally a second TWC forming a bottom layer 220.

Figure 5A:
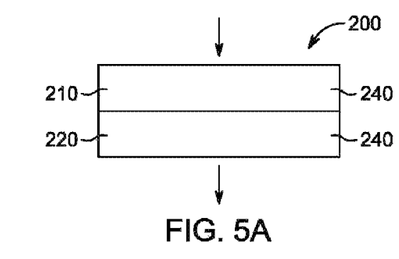
FIGS. 5A and 5B show schematic examples of layered TWCs of the converter depicted in FIG. 1.

The top and bottom layers 210, 220 are configured such that the exhaust gas from the internal combustion engine passes through the top layer 210 before passing through the bottom layer 220. The top layer includes Rh as the exclusive catalytically-active material, precious metal, or PGM such that the top layer 210 does not include any other type of precious metal and/or catalytically-active material.

Figure 5B:
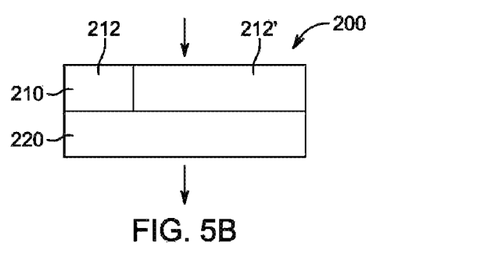
Figure 5C:
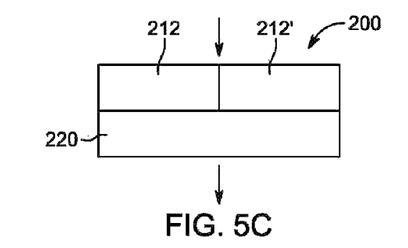
FIGS. 5C-5G schematically show configuration of individual zones within layers of the converter depicted in FIG. 1.
Figure 5D:
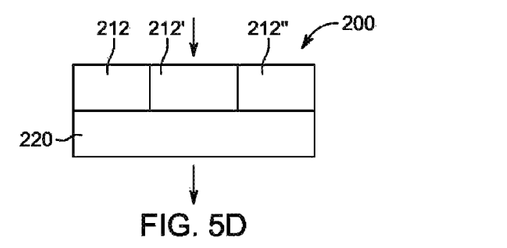

At least one of the TWCs 240 may be subdivided into at least two or more discreet zones. For example, as is depicted in FIGS. 5B and 5C, the TWC 210 may include two zones, 212 and 212', each including Rh as the exclusive precious metal. The loading in each zone may differ. In another embodiment, depicted in FIG. 5D, an additional Rh-only zone, 212", may be added.

Figure 5E:
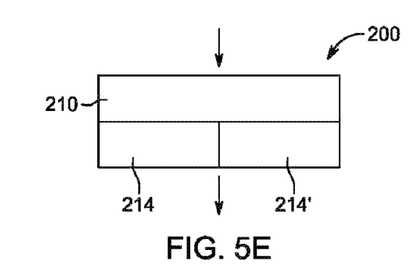
Figure 5F:
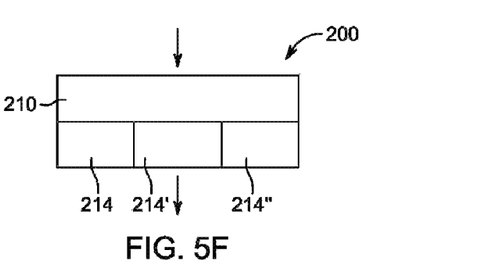

Alternatively, the bottom layer 220 may be subdivided into discreet zones 214, 214', 214", or the like. While FIGS. 5E and 5F depict two or three discreet zones, additional zones within the bottom layer 220 are contemplated. Each zone may differ by the composition of the precious metals and/or PGM loading. For example, only one of the zones may contain Rh, Pr, Pt, Ru, Ir, Au, AG, or Co while the remaining zones may include a mixture of two more of the mentioned precious metals. For instance, the middle zone 214', sandwiched between the zones 214 and 214" may contain Rh as the sole precious metal. Alternatively, the zones 214 and 214" may contain Pd as the only precious metal while the zone 214' may contain Rh as the only precious metal or a mixture of precious metals. Each zone may contain Rh as the only precious metal, but differ in Rh loading.

Figure 5G:
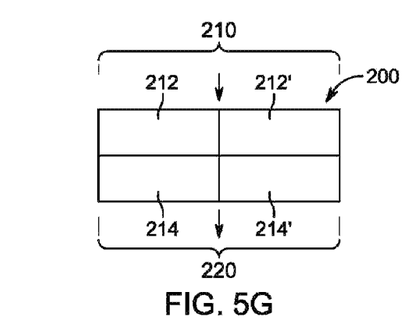

In at least one embodiment, the converter 200 may include at least two zones in the top layer 210 and at least two zones in the bottom layer 220. An example embodiment showing the same is depicted in FIG. 5G. While the individual zones of the layers 210 and 220 are depicted as even with respect to the volume//height/length, each layer may have multiple zones which differ from one another by volume/length/height.

Figure 6:
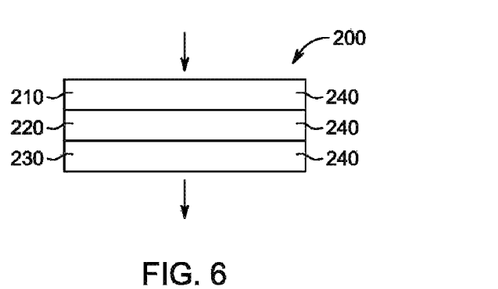
FIG. 6 shows a schematic example of a converter having an additional TWC layer.

Additional layers are contemplated. As FIG. 6 shows, the converter 200 may include three TWCs in the layered configuration, 210, 220, and 230. The TWC 220 is sandwiched between the TWCs 210 and 230. The exhaust gas passes through the layer 210 before passing through the layer 220 before passing through the layer 230.

The length/volume ratios, Rh, and PGM loadings described above with respect to the converter 20 having front and rear zones likewise apply to the embodiments of the converter 200 having the layered system. Rh loading in the top layer 210 may be different 4, 4.25, 4.5, 4.75, 5, 5.5, 6, 6.5, 7, 7.5, 8, 9, 10, 11, 12, 13, 14, 15, 18, 20, 25, 30, 35, 40, 45, 50, 55, 60, 70, 80, 90, 100 g/ft$^3$ or more or 0.14, 0.15, 0.16, 0.17, 0.18, 0.19, 0.2, 0.23, 0.25, 0.28, 0.32, 0.35, 0.39, 0.42, 0.46, 0.5, 0.53, 0.64, 0.71, 0.88, 1.06, 1.24, 1.41, 2.00, 1.77, 1.94, 2.12, 2.48, 2.83, 3.18, 3.53 g/dm$^3$, based on an overall PGM loading per volume of monolithic substrate. Rh loading may be about 4 to 30, 4.2 to 20, or 4.5 to 10 g/ft$^3$ which equals to 0.14 to 1.06, 0.15 to 0.7, or 0.16 to 0.36 g/dm$^3$, based on an overall PGM loading per volume of monolithic substrate.

The TWCs may have a support including transitional alumina, silica, titania, zirconia, lanthana, baria, or a combination thereof. The support material may be further modified with about 1 to 15 wt. %, 2 to 13 wt. %, or 5 to 10 wt. % of silicon, lanthanum, barium, or a combination thereof, based on the total weight of the catalyst. The support may include transitional alumina with an initial surface area in excess of about 200 m$^2$/g capable of retaining high surface area of at least about 100 to 150 m$^2$/g in the presence of automotive exhaust at temperatures up to about 1000° C. The support may include CZO having Ce and Zr in a ratio of Ce:Zr from about 0 to 100. The support may include alumina and CZO in a ratio of alumina:CZO if about 0 to 100.

To further improve resistance to phosphorus poisoning of the converter 20, 200, the Rh-only front/top layer TWC may have a high porosity support with porosity of about 40, 45, 50, 55, 60, 65, 70, 71, 72, 73, 74, 75, 76, 77, 78, 79, 80, 81, 82, 83, 84, 85%, or higher. The high porosity substrate may be, for example, ceramic. The high porosity TWC may be combined with other high porosity TWCs in a converter 20, 200. Alternatively, a converter 20, 200 may include just one high porosity TWC such as the front/top layer TWC, and the remaining TWCs may have a porosity of less than 40% such as 35, 30, 35, 20%, or lower.

The inclusion of the Rh-only TWC 26 as the front zone/top layer of the converter 20, 200 has resulted in a better N$_2$O formation control, improved net NOx %, and increased tolerance towards sulfur poisoning. Without limiting the disclosure to a single theory, it is presumed that Rh in TWC 26 is more resistant towards sulfur and phosphorus poisoning, and thus Pd, Pt, Ru present in TWC 28 are more protected from the influx of compounds capable of causing sulfur and/or phosphorus poisoning.

EXAMPLES

Examples 1-6

Commercial TWC substrates were obtained for Examples 1-6 and subsequently loaded with catalysts containing PGM/washcoat components according to Table 1. Table 1 lists dimensions and PGM loadings of each example. Examples 1-4 were tested as single monoliths. Examples 5 and 6 were both prepared as double monoliths with zoned TWCs, having a front Rh-only TWC and a rear TWC. Examples 5 and 6 had different volumes of the front and rear TWCs.

TABLE 1

TWC dimensions and PGM loadings of Examples 1-6

| Example No. | TWC dimension [in$^3$/dm$^3$] | Total PGM [g/ft$^3$/g/dm$^3$] | Pt loading [g/ft$^3$/g/dm$^3$] | Pd loading [g/ft$^3$/g/dm$^3$] | Rh loading [g/ft$^3$/g/dm$^3$] |
|---|---|---|---|---|---|
| Single monolith | | | | | |
| 1 | 75/1.23 | 30/1.06 | 0 | 0 | 30/1.06 |
| 2 | 75/1.23 | 50/1.77 | 0 | 42/1.48 | 8/0.28 |
| 3 | 75/1.23 | 50/1.77 | 0 | 48/1.70 | 2 |
| 4 | 75/1.23 | 50/1.77 | 0 | 50/1.77 | 0/0.07 |
| Double monolith | | | | | |
| 5 front TWC | 37.5/0.61 | 30/1.06 80/2.83 | 0 | 0 | 30/1.06 |
| 5 rear TWC | 37.5/0.61 | 50/1.77 | 0 | 42/1.48 | 8/0.28 |
| 6 front TWC | 18.5/0.30 | 30/1.06 | 0 | 0 | 30/1.06 |
| 6 rear TWC | 56.25/0.92 | 50/1.77 80/2.83 | 0 | 42/1.48 | 8/0.28 |

All Examples 1-6 were aged on an engine-dynamometer for 100 hr at 1720° F. (937.8° C.), which represented 150,000 road miles (241,401.6 km). After aging, the catalytic performance of Examples 1-6 was evaluated using FTP-75 and US-06 cycles. FTP-75 is the US Environmental Protection Agency's Federal Test Procedure for the city driving cycle to measure tailpipe emissions and fuel economy of passenger cars. It has been used for emission certification and fuel economy testing of light-duty vehicles in the US. The US-06 is a Supplemental Federal Test Procesure (SFTP), which was developed to address shortcomings with the FTP-75 test cycle in the representation of aggressive, high speed, and/or high acceleration driving behavior, rapid speed fluctuations, and driving behavior following startup.

Figure 7:
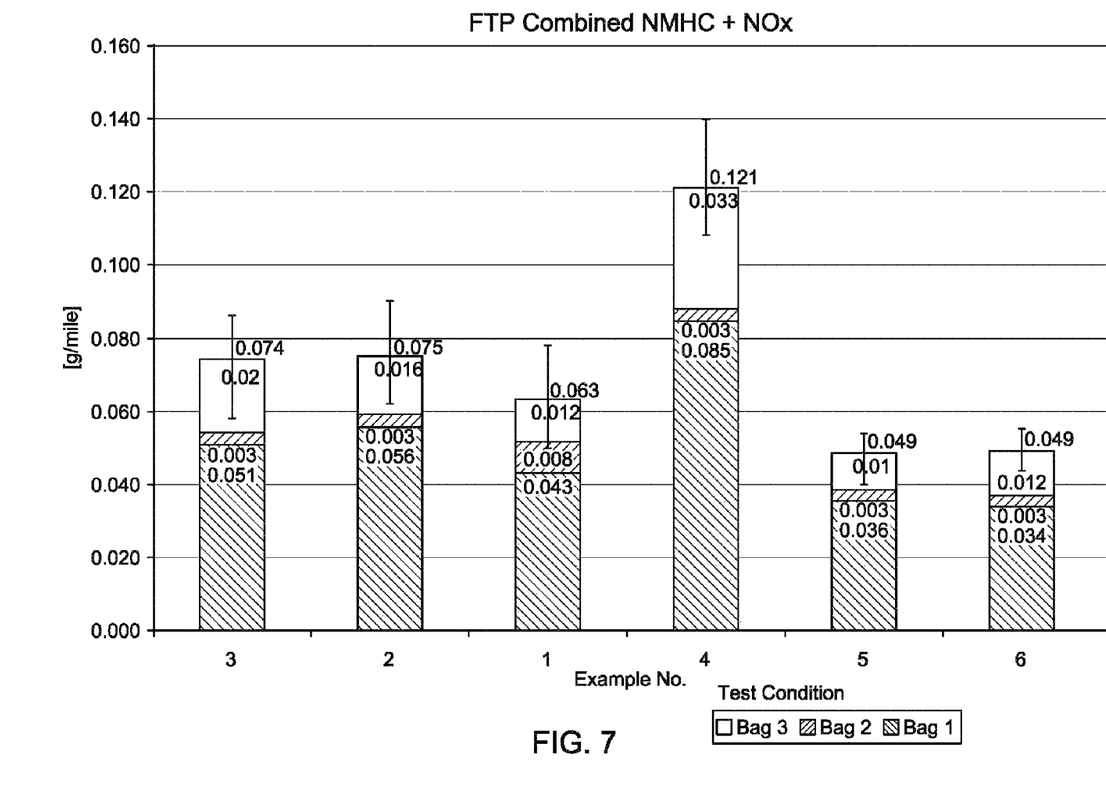
FIG. 7 shows FTP-75 test results for combined NMHC and NOx for TWCs having different catalytically-active material compositions and loadings.
Figure 8:
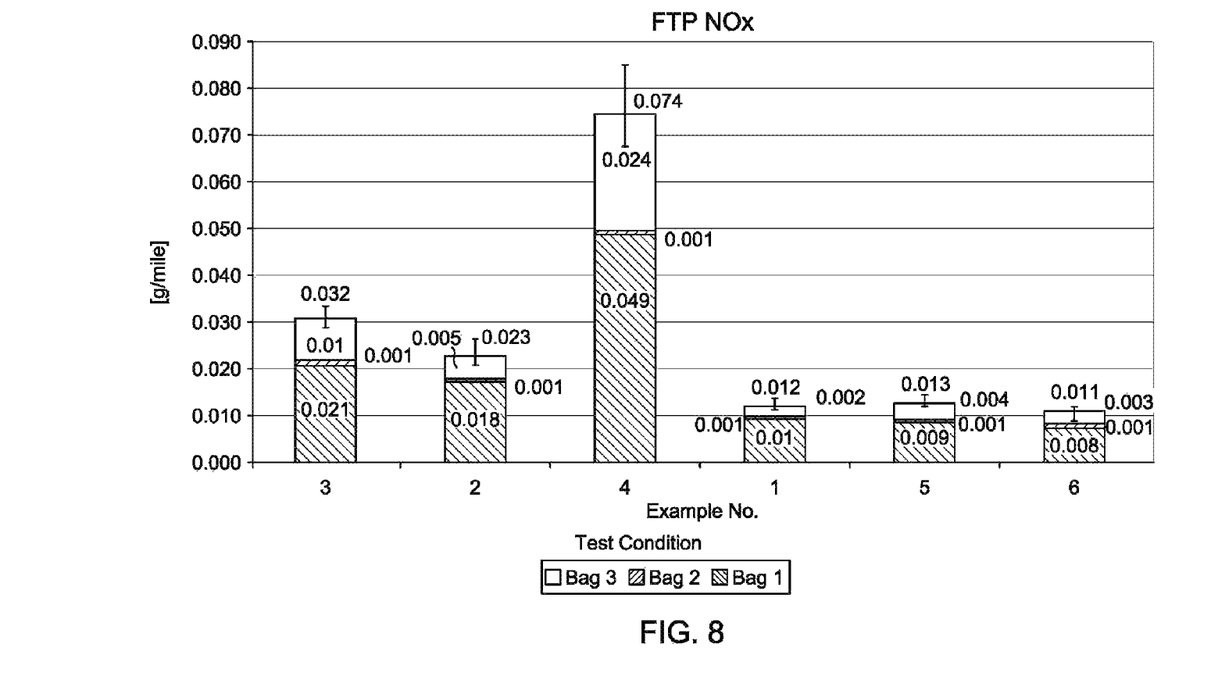
FIG. 8 shows FTP-75 NOx results for the TWCs of FIG. 7.
Figure 9:
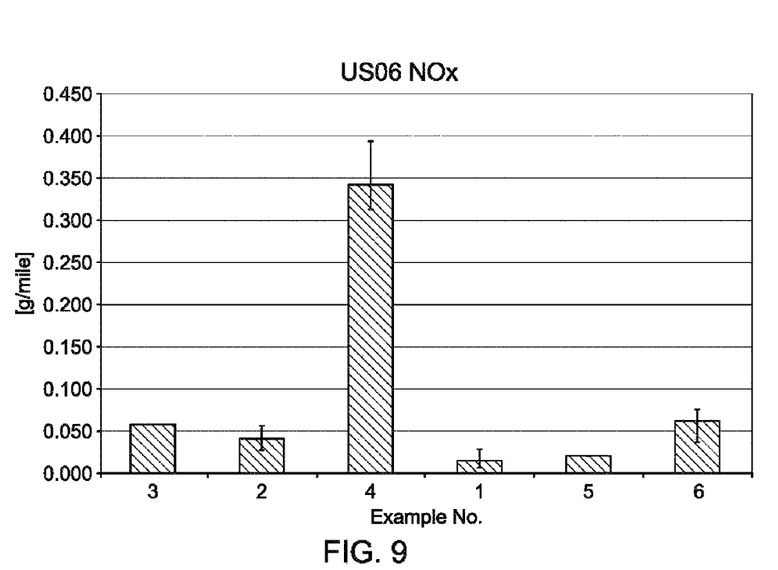
FIG. 9 shows US-06 NOx test results for the TWCs of FIG. 7.

The cold start FTP-75 results for Examples 1-6 are shown in FIG. 7. As FIG. 7 illustrates, the zoned TWCs with Rh-only front TWC of Example 1 and Examples 5 and 6 provided the best results for combined NOx and NMHC conversion under the FTP-75 testing. Likewise, FIG. 8 shows that the Rh-only front TWC system of Example 1 and the dual monolith with Rh-front TWCs of Examples 5 and 6 performed the best with respect to cold start NOx conversion under the FTP-75 testing. FIG. 9 shows similar results with respect to US-06 NOx conversion testing as Examples 1, 5, 6, all having front Rh-only TWC, performed the best.

Examples 7-9

Commercial TWC substrates were obtained for Examples 7-9 and subsequently loaded with catalysts containing PGM/washcoat components according to Table 1.

TABLE 2

| | | | | | |
|---|---|---|---|---|---|
| TWC length and PGM loadings of Examples 7-9 | | | | | |
| Example No. | TWC lenght [in/cm] | Total PGM [g/ft³/g/dm³] | Pt loading [g/ft³/g/dm³] | Pd loading [g/ft³/g/dm³] | Rh loading [g/ft³/g/dm³] |
| Single monolith | | | | | |
| 7 | 1/2.54 | 54/1.91 | 0 | 48/1.70 | 6/0.21 |
| Double monolith | | | | | |
| 8 front TWC | 0.5/1.27 | 50/1.77 | 56/2.00 | 0 | 50/1.77 | 0 |
| 8 rear TWC | 0.5/1.27 | 6/0.21 | 0 | 0 | 6/0.21 |
| 9 front TWC | 0.5/1.27 | 6/0.21 | 56/2.00 | 0 | 6/0.21 |
| 9 rear TWC | 0.5/1.27 | 50/1.77 | 0 | 50/1.77 | 0 |

A 1 inch (2.54 cm) long core having a diameter of 0.375 inch (0.95 cm) was taken from each brick prior to aging. The cores for Examples 7-9 were aged using a 4-mode aging cycle. The aging temperature was 900° C. (1652° F.) inlet and the total aging time was 25 hours. Following the aging, a piece of each aged catalyst core was loaded into a lab scale flow reactor for catalyst activity tests. The reactants used in the experiments simulated engine exhaust gases, CO, $H_2$, HC ($C_3H_6$), NO, $CO_2$, $H_2O$, and in a $N_2$ carrier. Examples 7-9 were then tested using lab lambda sweep tests performed at 450° C. (842° F.), and the conversions of CO, $C_3H_6$, and NOx were measured from lambda 0.998 to lambda 1.006.

Figure 10:
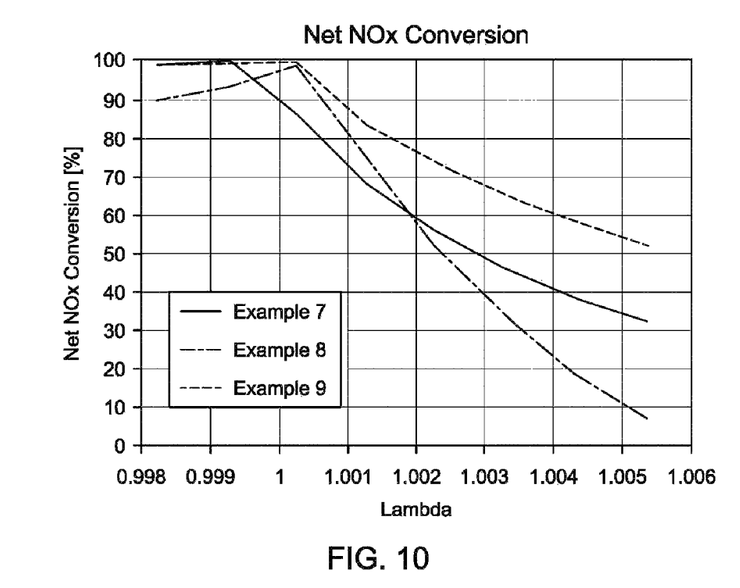
FIG. 10 shows a plot of Lambda versus Net NOx conversion for TWCs having different catalytically-active material compositions and loadings.
Figure 11:
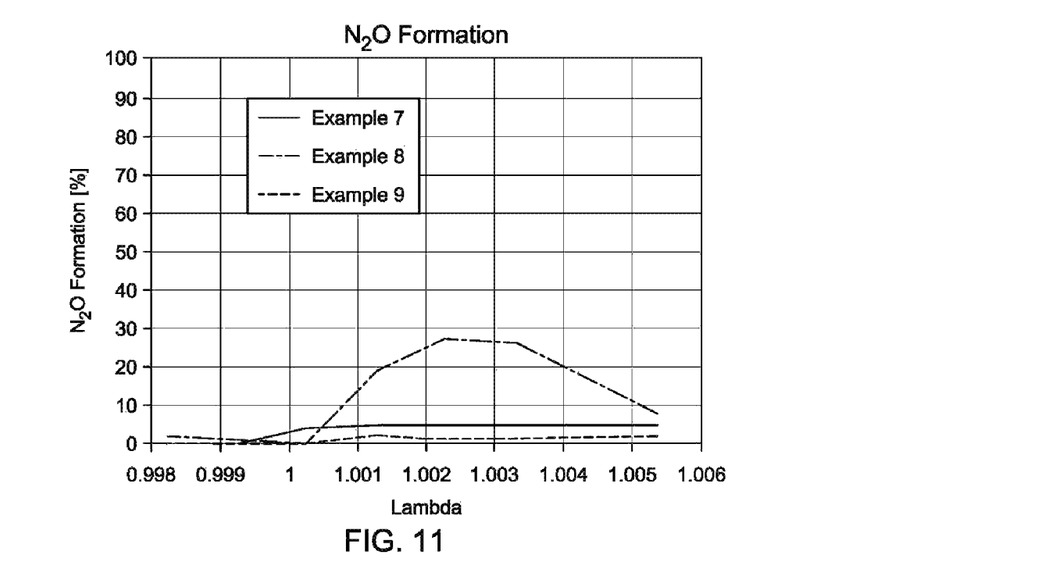
FIG. 11 shows a plot of Lambda versus $N_2O$ formation for TWCs of FIG. 10.

FIG. 10 shows results for Net NOx conversion for Examples 7-9. As can be seen from the plot of FIG. 10, the Rh-only front TWC of Example 9 had the best Net NOx % conversion. FIG. 11 illustrates $N_2O$ formation. The Rh-only front TWC of Example 9 showed significantly lower $N_2O$ % formation than Examples 7 and 8.

Examples 10-13

Figure 12:
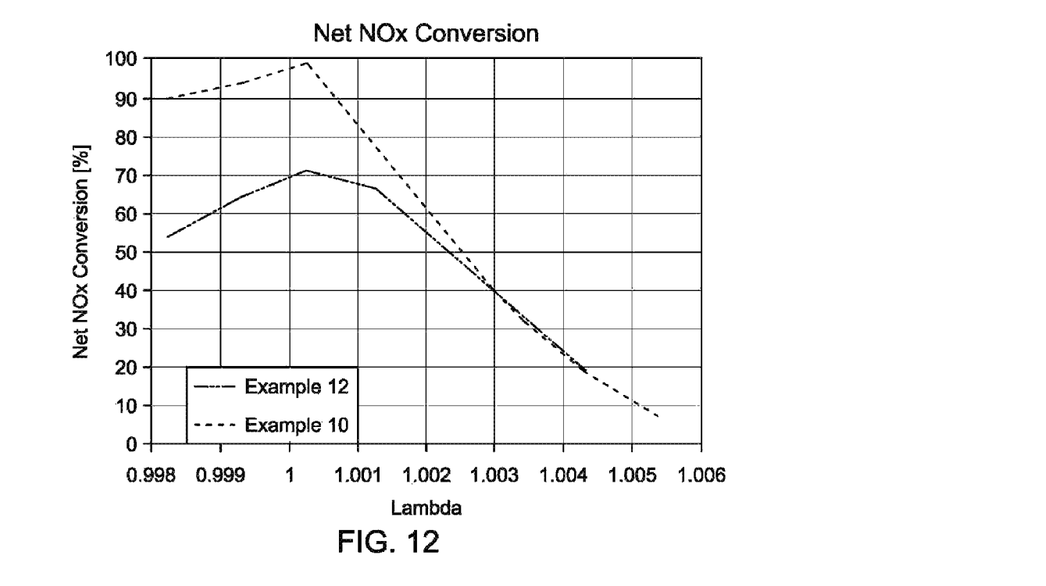
FIG. 12 is a plot of Lambda versus Net NOx conversion for Pd-only front TWC in presence and absence of $SO_2$.
Figure 13:
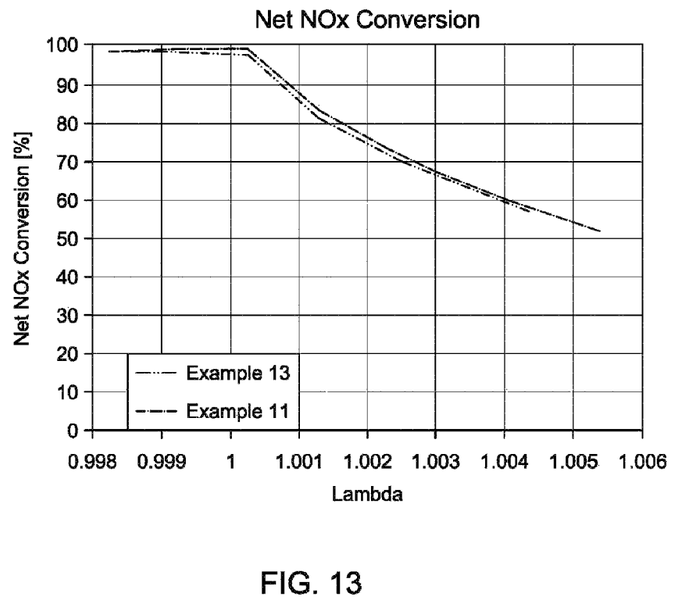
FIG. 13 is a plot of Lambda versus Net NOx conversion for Rh-only front TWC in presence and absence of $SO_2$.

Commercial TWC substrates were obtained for Examples 10-13 and subsequently prepared the same way as Examples 8 and 9. Specifically, Examples 10 and 12 represented Pd-only front TWC with the same PGM loading in the front and rear TWCs as Example 8. Examples 11 and 13 represented Rh-only front TWCs with the same PGM loading in the front and rear TWCs as Example 9. After aging, Examples 10 and 11 were tested using the above-described lambda sweep tests in absence of $SO_2$. Examples 12 and 13 were tested using the above-described lambda sweep tests in presence of 4 ppm $SO_2$. The test results for Examples 10-13 are depicted in FIGS. 12 and 13. As FIGS. 12 and 13 show, Examples 11 and 13 having Rh-only front TWCs performed equally well when $SO_2$ was present or absent. Thus, the presence of $SO_2$ did not negatively influence the TWC's NOx performance. In contrast, presence of $SO_2$ had a significantly negative influence on Example 12. The Net NOx % conversion for the system with Pd-only front decreased when $SO_2$ was present.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An automotive catalytic converter comprising:
   a substrate;
   a bottom three-way catalyst layer disposed on the substrate and having at least a first zone and a second zone that differ by the composition of the precious metals and/or PGM loading; and
   a top three-way catalyst layer disposed on the bottom layer and comprising Rh as the only precious metal configured as a front zone, and a mixture of Rh and Pd, Pt, or both configured as a rear zone, such that an exhaust gas from an internal combustion engine passes through the front zone before passing through the rear zone,
   wherein the Rh loading in the front zone is 30 g/ft³ or more based on an overall PGM loading per volume of the substrate.

2. The catalytic converter of claim 1, wherein the Rh loading in the front zone is about 5 times higher than the Rh loading in the rear zone.

3. The catalytic converter of claim 1, wherein the converter further includes an additional zone including a three-way catalyst comprising Rh as the only precious metal, the additional zone being arranged such that the rear zone is sandwiched between the front zone and the additional zone.

4. The catalytic converter of claim 1, wherein a length/volume ratio of the front zone to the rear zone is from about 100 to 1, but different from 50/50.

5. The catalytic converter of claim 1, wherein the front zone forms about 5% and the rear zone about 95% of an overall converter volume.

6. The catalytic converter of claim 1, wherein the converter is a close-coupled converter.

7. The catalytic converter of claim 1, wherein the converter includes a support having a porosity of about 50-80%.

8. The automotive catalytic converter of claim 1, wherein the bottom three-way catalyst layer includes a third zone that has a different composition of the precious metals and/or PGM loading.

9. The automotive catalytic converter of claim 8, wherein the second zone is sandwiched between the first zone and the third zone and contains Rh.

10. An automotive catalytic converter comprising:
   a three-way catalyst comprising Rh as the only precious metal arranged as a top layer;
   a three-way catalyst comprising Rh, Pd, Pt, Ru, or a mixture thereof, and configured as a bottom layer disposed below the top layer and having at least a first zone and a second zone that differ by the composition of the precious metals and/or PGM loading, the top and bottom layers are configured as discreet layers such that an exhaust gas from an internal combustion engine passes through the top layer before passing through the bottom layer; and
   a support including alumina and CZO having Ce and Zr in a ratio of Ce:Zr from about 0 to 100.

11. The catalytic converter of claim 10, wherein the support is a monolithic substrate and the Rh loading in the top layer is about 4 to 45 g/ft$^3$ (0.14 to 1.59 g/dm$^3$), based on an overall PGM loading per volume of the monolithic substrate.

12. The catalytic converter of claim 10, wherein the bottom layer includes Rh, the Rh loading in the bottom layer being about 5 times lower than the Rh loading in the top layer.

13. The catalytic converter of claim 10, wherein the top layer, the bottom layer, or both have at least a first zone and a second zone, the zones being discreet zones with different PGM loadings.

14. The catalytic converter of claim 13, wherein a first zone of the top layer has Rh loading of about 4 to 45 g/ft$^3$ (0.14 to 1.59 g/dm$^3$), based on an overall PGM loading per volume of the support, and a second zone of the top layer has Rh loading about five times lower than the first zone.

15. The catalytic converter of claim 10, wherein the bottom layer includes no other precious metal besides Pd.

16. An automotive catalytic converter comprising:
   a first three-way catalyst comprising a single precious metal, arranged on a support, as a top layer;
   a second three-way catalyst comprising at least Rh as a precious metal, the second three-way catalyst configured as a bottom layer having discreet front and second zones; and
   disposed below the top layer and,
   the top and bottom layers configured such that an exhaust gas from an internal combustion engine passes through the top layer before passing through the bottom layer; and
   a third three-way catalyst comprising Rh as the only precious metal, the third three-way catalyst forming a discreet layer configured such that the first and third three-way catalysts sandwich the second three-way catalyst in between.

17. The catalytic converter of claim 16, wherein the top layer and the bottom layer include Rh as the only precious metal such that the Rh loading in the top layer is different from the Rh loading in the bottom layer.

18. The catalytic converter of claim 16, wherein the single precious metal is Rh.

19. The catalytic converter of claim 16, wherein the bottom layer comprises Rh, Pd, Pt, Ru, or a combination thereof.

20. The catalytic converter of claim 16, wherein a length/volume ratio of the top layer to the bottom layer is from about 100 to 1, but different from 50/50.

* * * * *